(12) United States Patent
Andorfer et al.

(10) Patent No.: US 6,430,461 B1
(45) Date of Patent: Aug. 6, 2002

(54) PROCESS FOR MONITORING AND CONTROLLING THE QUALITY OF ROLLED PRODUCTS FROM HOT-ROLLING PROCESSES

(75) Inventors: Josef Andorfer, Pfarrkirchen; Dietmar Auzinger, Altenberg; Rudolf Pichler, Rottenegg, all of (AT)

(73) Assignee: Voest-Alpine Industrieanlagenbau GmbH, Linz (AT)

(*) Notice: Subject to any disclaimer, the term of this patent is extended or adjusted under 35 U.S.C. 154(b) by 0 days.

(21) Appl. No.: 09/302,577

(22) Filed: Apr. 30, 1999

Related U.S. Application Data (63) Continuation-in-part of application No. PCT/AT97/00232, filed on Oct. 29, 1997.

(30) Foreign Application Priority Data

Oct. 30, 1996 (AT) .......................... A 1896/96

(51) Int. Cl.⁷ .......................... G06F 19/00; G05B 13/02
(52) U.S. Cl. .................... 700/148; 700/149; 700/150; 700/30; 700/31
(58) Field of Search .................... 700/147, 148, 700/149, 150, 153, 155, 299, 30, 31

(56) References Cited

U.S. PATENT DOCUMENTS

| | | | |
|---|---|---|---|
| 3,713,313 A | * 1/1973 | Spradlin | 72/10.4 |
| 3,787,667 A | 1/1974 | King et al. | |
| 4,840,051 A | 6/1989 | Boratto et al. | |
| 4,941,338 A | * 7/1990 | Spath | 72/151 |
| 5,357,443 A | 10/1994 | Watanbe et al. | |
| 5,461,894 A | * 10/1995 | Sorgel | 72/9.2 |
| 5,673,368 A | 9/1997 | Broese et al. | |
| 5,698,050 A | * 12/1997 | El-Soudani | 148/671 |

FOREIGN PATENT DOCUMENTS

| | | |
|---|---|---|
| DE | 3836534 | 6/1989 |
| DE | 3925047 | 1/1991 |
| DE | 4338608 | 8/1995 |
| DE | 4421005 | 12/1995 |
| EP | 541825 | 5/1993 |

OTHER PUBLICATIONS

Samoilov et al., Diffusion–Controlled Growth of Carbonitride Precipitates in Titanium/Niobium Microalloyed Steels, Phase Transformations During the Thermal/Mechanical Processing of Steel, ed. E.B. Hawbolt and S. Yue, CIM Vancouver, pp. 67–77 (1995).

Pietrzyk et al., Thermal–Mechanical Modelling of the Flat Rolling Process, Springer–Verlag Berlin Heidelberg, pp 53 to 66 (1991).

(List continued on next page.)

Primary Examiner—Leo Picard
Assistant Examiner—Ryan Jarrett
(74) Attorney, Agent, or Firm—Greenblum & Bernstein, P.L.C.

(57) ABSTRACT

Process to monitor and control the quality of rolled products from hot-rolled processes which produce products such as sheets, rods, etc., from input stock such as slabs, billets, etc. The process estimates in advance the expected material properties of the end product at each step of the hot-rolling production process. The process further provides that conditions, such as temperature, reduction depth, etc., are detected on-line throughout the entire rolling process and from the values obtained, via interrelated physical—metallurgical and/or statistical models describing the whole rolling process, the mechanical/technical material properties to be expected, particularly the yield point, the tensile strength and the breaking elongation point of the rolled product, are calculated. On-line detection of the actual and momentary production conditions is necessary to allow the material properties to always be estimated in advance.

51 Claims, 2 Drawing Sheets

OTHER PUBLICATIONS

Buchmayr et al., Modeling of the Temperature Field, Transformation Behavior, Hardness and Mechanical Response Low Alloy Steels During Cooling from the Austenite Region, J. Heat Treat 8, pp. 127–136 (1990).

Materials Science and Technology, vol. 7: "Constitution and Properties of Steel," ed. R.W. Cahn, P. Haasen, E.J. Kramer, Wernheim New York Basel Cambridge, pp 40 to 60 (1992).

Yoshie et al., "Modelling of Microstructural Evolution and Mechanical Properties of Steel Plates Produced by Thermo–Mechanical Control Process," *ISIJ International,* vol. 32, pp 395–404 (1992).

Abstract of RU 2 060 846 C1 (Cemd Cherp Metal Wks) May 27, 1996, Russian patent abstract in Derwent Week (DW 9708) (1997).

Andorfer et al., "Prediction of the as hot Rolled Properties of Plain Carbon Steels and HSLA Steels", Thermec '97 Proceedings, ed. T. Chandra and T. Sakai, The Metals, Minerals & Materials Society (TMS), pp 1–7, Apr. 29, 1999.

D. Auzinger et al., "Advanced process models for today's hot strip mills", MPT International, vol. 18, No. 6, pp. 58–64, Dec. 1995.

N. Zentara et al., "Optimierung der Stichplane beim Direktwalzen von Dunnbrammen aus Stahl", Stahl und Eisen., vol. 116, No. 4, pp. 99–105 and 179, Apr. 15, 1996.

T. Heller et al., "Rechnersimulation der Warmunformung und der Umwandlung am Biespiel der Warmbanderzeugung", Stahl und Eisen, vol. 116, No. 4, pp 115 to 122, Apr. 1996.

K.P. Dufert et al., "Berechnung der Gefugeentwicklung und der mechanischen Eigenschaften beim Warmwalzen", Stahl und Eisen, vol. 112, No. 10, pp. 93–98, Oct. 16, 1992.

D. Auzinger et al., VAI's New Efficient Solution for Controlling the Mechanical Properties of hot Rolled Strip, Conference Record of the 1997 IEEE Industrial Applications Conference, New Orleans, pp. 2131–2136, Oct. 5, 1997.

* cited by examiner

PROCESS FOR MONITORING AND CONTROLLING THE QUALITY OF ROLLED PRODUCTS FROM HOT-ROLLING PROCESSES

CROSS-REFERENCE TO RELATED APPLICATIONS

The present application is a Continuation-In-Part of International Application No. PCT/AT97/00232, filed Oct. 29, 1997, and claims priority under 35 U.S.C. §119 of Austrian Patent Application No. A 1896/96, filed on Oct. 30, 1996. The disclosures of the International and Austrian Applications are expressly incorporated by reference herein in their entireties.

BACKGROUND OF THE INVENTION

1. Field of the Invention

The invention relates to a process for monitoring and controlling the quality of rolled products from hot-rolling processes in which rolled products such as sheets, strips, profiles, rods, wire, etc. are produced from input stock such as slabs, thin slabs, blooms, billets, etc.

2. Discussion of Background Information

The input stock solidified in the ingot mold has a fairly coarse primary structure, and the individual crystals have grown inward from the walls in the form of columnar crystals or dendrites. In order to achieve sufficient toughness, the structure must be refined. This is most effectively performed by mechanically breaking up the structure during rolling. The hot forming must be carried out essentially above the upper transformation line in the iron-carbon diagram, approximately in the range from 1100 to 850° C., depending on the composition of the steel, the upper temperature range serving mainly for shaping and the lower one for structure refining.

The article "Rechnersimulation der Warmumformung und der Umwandlung am Beispiel der Warmbanderzeugung" [Computer simulation of hot forming and transformation using hot strip production as an example] from Stahl und Eisen [Steel and Iron] 116 (1996) No. 4 of Apr. 15, 1996, presents the intermeshing models of shaping and structure development while taking into account the local forming characteristics. Individual calculations with various partial models, for example for the kinetics of dissolution and precipitation of microalloy elements and for the recrystallization sequence, underline the efficiency of the system with which complex production tasks can be performed. Thus, causes for the occurrence of an inhomogeneous ferrite structure in a tubular steel are derived from the simulation data and measures for improving the homogeneity are proposed.

The calculation of the effect of the cooling conditions on the transformation behavior of construction steel and the effect of the cooling conditions in the finish-rolled material on the changes in the strength properties over the strip length permit a quantitative evaluation of the influencing variables.

In cold working of the material, free dislocations must first be generated, which can then move along the slip planes. The generation occurs either through pulling off of "anchored" dislocations or activation of dislocation sources. Atoms such as C or N attached to dislocations make the pulling off and thus the generation of free dislocations difficult. Macroscopically, the effect is visible by a pronounced yield point. The strain in the material increases until it is sufficient to pull off the dislocation from attached atoms ("upper yield point"), i.e., if there is a sufficient strain, the dislocation is separated from the attached atoms. If the dislocations are then free, less strain is required for further dislocation movement ("lower yield point"). The strain necessary for the movement of free dislocations increases again only when impeded by other dislocations.

If the material is cold worked to a small extent before actual processing, dislocations are already generated. The frequency, distribution, and localization of the dislocations generated is affected by the type of cold working (e.g., stretcher-and-roller leveling, temper passing). The resistance which atoms such as C or N oppose the slip along existing dislocation planes is overcome with sufficient cold working (e.g., stretcher-and-roller leveling, temper passing with normal expansions).

Figure 2:
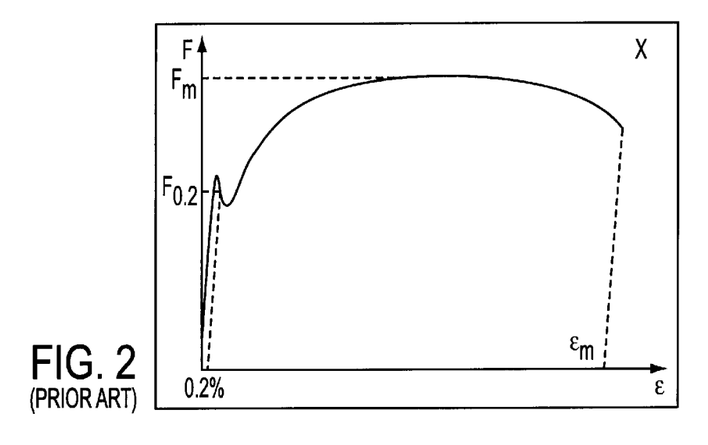
FIG. 2 schematically illustrates a prior art force-strain diagram measured in a tensile strength test of a material with a pronounced yield point.
Figure 3:
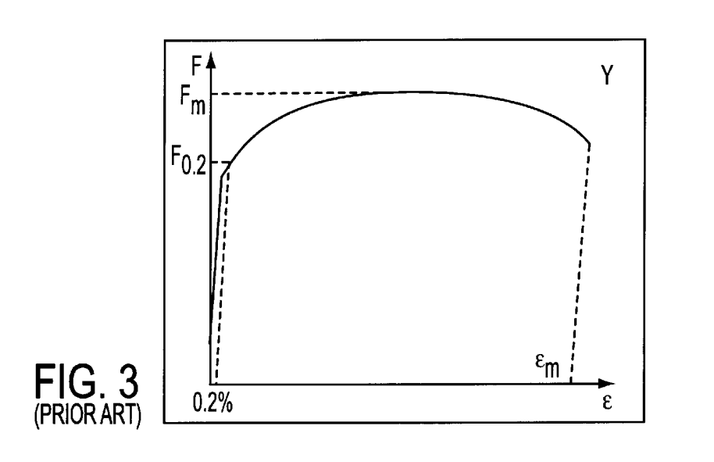
FIG. 3 schematically illustrates a prior art force-strain diagram of the same specimen when subjected before the tensile strength test to cold working stretching of $\epsilon_1$%.
Figure 4:
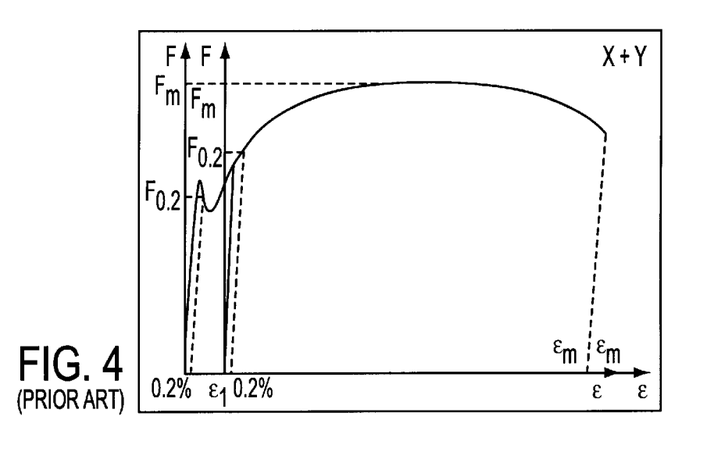
FIG. 4 schematically illustrates a correlation of the prior art diagrams depicted in FIGS. 2 and 3.

FIG. 2 shows schematically a force-strain diagram (force F, strain $\epsilon$) measured in a tensile strength test of a material with a pronounced yield point (Part X), and FIG. 3 shows the force-strain diagram (Part Y) of the same specimen when it was subjected before the tensile strength test to cold working, in this case stretching of $\epsilon_1\%$. FIG. 4 shows part X+Y, which correlates the two aforementioned diagrams of FIGS. 2 and 3. In the tensile strength test with prior deformation, the first part of the force-strain curve of the nondeformed material (X) is blended out. With sufficient prior deformation, the pronounced yield point (the peak in (X)) is also blended out. Depending on the extent of the prior deformation, the yield point can rise or fall relative to the nondeformed material, as long as the nondeformed material has a pronounced yield point. If it has no pronounced yield point, the yield point rises in each case.

To determine the mechanical-technical characteristics $R_{p0.2}$ and $R_m$, the measured forces $F_{0.2}$ and $F_m$ are divided by the cross-sectional area of the specimen (perpendicular to the direction of tension). In the test (Y), this cross-sectional area is already reduced compared to the test (X). Consequently, in our example in the case (Y), the tensile strength is greater than in the case (X), although the same maximum force $F_m$ was measured.

If sufficient interstitial atoms (C or N) are present in the basic material, they will also diffuse in the cold worked material at room temperature after a more or less longer time period to the dislocations present and pin them. Thus, a pronounced yield point also develops again in the cold worked material under certain circumstances (age hardening). To describe this age hardening, it is above all essential to know the amount of dissolved C and N. In BH-steels (bake hardening steels), this age hardening mechanism is expediently used to obtain a higher yield point after cold working and heat treatment (shortening of the diffusion time).

Only a very small quantity of C can be dissolved in ferrite. With clearly higher C-content, the carbon is precipitated as cementite ($Fe_3C$) in various forms (for example, pearlite, grain boundary cementite, intercrystalline), whereby the respective form and quantity of the cementite precipitates also depend very much on the $\gamma$-$\alpha$-phase transformation and the temperature progression. Under ordinary production conditions, in steels with C-content >.20, insufficient carbon to cause age hardening remains dissolved. At a lower C-content, cementite formation occurs more or less completely as a function of the temperature progression, such that sufficient carbon can be dissolved to cause intentional or unintentional age hardening.

In small quantities, carbon can, however, also be bound in precipitates. Above all in steels with very low C-content, alloy elements such as Ti, Nb, V are often used to bind the free carbon by precipitation. In this case, the precise knowledge of the amount and composition of these precipitates is important to calculate the amount of remaining free C.

The nitrogen present in the material can be bound in precipitates with Ti, Nb, Al, among others. Consequently, the precise knowledge of the amount and composition of these precipitates is important to calculate the amount of remaining free N. Above all in steels in which only Al is present as the single significant alloy element for N binding (construction steels and soft steels), under ordinary production conditions in hot-rolled strip production, the cooling curve in the cooling section and in the wound state is significant for AlN formation.

Through knowledge of the amount of dissolved C and N, it is possible to infer a pronounced yield point and thus also the change in the yield point by means of prior cold working. Moreover, it is possible with a cold worked material to calculate the redesigning of a pronounced yield point as a function of the quantity of dissolved C and N and the time elapsed since the cold working as well as the temperature during this time.

SUMMARY OF THE INVENTION

The object of the invention is to provide a process with which the material properties of the end product which are to be expected can be calculated in advance at each step of the hot rolling production process.

The above object is achieved by the invention, wherein production conditions such as temperatures, reductions per pass, etc. are detected on-line throughout the entire rolling process, and wherein the mechanical/technological material properties to be expected, in particular the "yield point", the tensile strength and the breaking elongation point, of the rolled product are calculated in advance therefrom by means of interrelated physical/metallurgical and/or statistical models describing the entire rolling process. On-line detection of the actual and instantaneous production conditions is necessary to enable the material properties to be expected always to be calculated in advance.

In addition, it is advantageous that, in the event of deviations of the precalculated material properties of the rolled product from the required mechanical/technological material properties of said product during the rolling process, the deviations are corrected in the subsequent production step. This ensures that the required mechanical/technological material properties are maintained.

It is furthermore advantageous that the reference chemical analysis of the "input stock" and the production conditions, which are the time-temperature curves and time-temperature deformation curves in the individual production steps, are optimized with the physical/metallurgical and/or statistical models describing the entire rolling process and are established for novel related product qualities. It is therefore possible to establish suitable production conditions for such related product qualities without long test series.

In an embodiment of the process, each input stock is identified and the characteristic properties, such as the chemical analysis, the dimension, the precipitation state arising from the preceding temperature curve, such as, size, amount, type, distribution of precipitates, such as AlN, TIN, TiC, TiNbCN, VC, etc., degree of existing segregations, etc., are input into a physical/metallurgical austenitization and precipitation model which calculates the characteristic material properties, such as austenite grain size and precipitation state, in particular dissolution of precipitates, from the time-temperature curve for heating the input stock to rolling temperature, and the material properties present after the heating, in particular temperature, dimension, austenite grain size and precipitation state, are then input into a physical/metallurgical deformation, recrystallization, transformation and precipitation model which calculates the characteristic properties, in particular austenite grain size, temperature distribution, precipitation state, degree of recrystallization, etc., from the time-temperature deformation sequence during the rolling process, and these material properties are further input into a physical/metallurgical cooling, transformation, precipitation and aging model which calculates the characteristic properties of the rolled product, in particular the microstructure including the proportions of structural constituents, such as austenite, ferrite, pearlite, bainite and martensite, and their properties, such as ferrite grain size, pearlite interlamellar spacing, etc., and the precipitation state, from the cooling curve for the rolled product in a cooling means provided for this purpose and during the subsequent free unforced remaining cooling and aging of the rolled product in the rolled-up, stacked, bundled, etc. state, and the properties describing the rolled product finished for further use, such as dimension, chemical analysis, microstructure and precipitation state, etc., are further input into a physical/metallurgical material model which determines the mechanical/technological material properties of the rolled product taking into account any cold forming, for example stretcher-and-roller leveling. This is a possible detailed sequence of possible steps of the basic process according to the invention.

In a further embodiment of the process, in the event of deviations in the characteristic data of the input stock, of the heating curve, of the rolling curve and of the cooling curve, the changes, necessary for maintaining the required mechanical/technological material properties, in the time-temperature curve for the heating, in the time-temperature deformation curve during rolling and in the time-temperature curve during cooling are calculated on-line and by means of the physical/metallurgical austenitization, deformation, recrystallization, transformation, precipitation, cooling and material models and are transmitted to the control system of the heating, rolling and cooling plant. This ensures the maintenance of the required mechanical/technological material properties of the rolled product within the remaining possibilities.

It is advantageous that the reference chemical analysis of the input stock and production conditions are optimized with the physical/metallurgical austenitization, deformation, recrystallization, transformation, precipitation, cooling and material models and are established for novel related product qualities.

In a further embodiment of the process, statistical models are set up by means of the linear regression method with the data from samples of rolled products and the associated input stock properties and production conditions and are continuously improved with further data from samples of rolled products and the associated input stock properties and production conditions and are adapted to these.

According to one embodiment, an adaptation and an adjustment of the physical/metallurgical models are carried out using the data from rolled products and their input stock properties and production conditions. This ensures that the models are always very close to the actual conditions.

According to a further embodiment, the physical/metallurgical and the statistical models for calculation in advance of the mechanical/technological properties of a rolled product and the on-line correction of the production conditions have been realized on a process computer.

A further advantage is that adaptation, adjustment and improvement of the physical/metallurgical and of the statistical models for calculating in advance the mechanical/ technological properties of a rolled product have been realized on a process computer.

It is furthermore advantageous that the physical/ metallurgical and the statistical models for optimizing and establishing suitable production conditions for achieving the mechanical/technological properties of a rolled product have been realized on a process computer.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted drawing by way of a non-limiting example of exemplary embodiment of the present invention, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
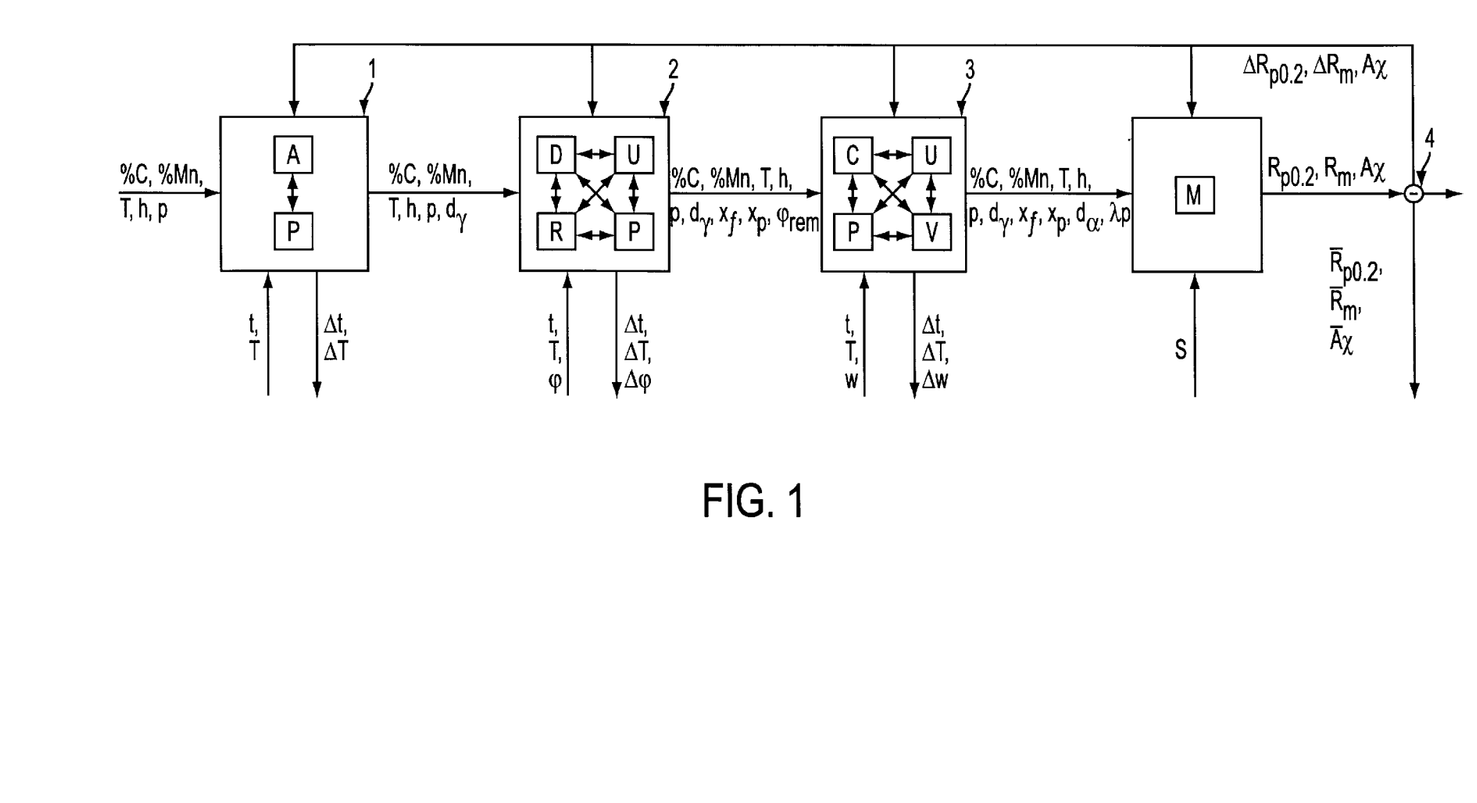
FIG. 1 schematically illustrates the individual models and as partial models.

The development of the structure during the heating of the input stock is simulated with the austenitization model A, e.g., as discussed in U.S. Pat, No. 5,357,443 and/or EP 0 541 825 (see, e.g., page 5, line 53—page 6, line 4), the disclosures of which are expressly incorporated by reference herein in their entireties, and precipitation model P, e.g., as discussed in U.S. Pat. No. 5,357,443 and/or EP 0 541 825 (see, e.g., page 4, lines 45+), and/or Samoilov et al., *Diffusion-Controlled Growth of Carbonide Precipitates in Titanium/Niobium Microalloyed Steels,* Phase transformations during the thermal/mechanical processing of steel, ed. E. B. Hawbolt and S. Yue, CIM Vancouver, pp. 66–77 (1995), the disclosure of which is also expressly incorporated by reference herein in its entirety, which operate in association, in partial model 1, the values of the chemical analysis, for example %C, %Mn, the temperature T, the thickness or dimensions h and the precipitation state p of the input stock being input into this partial model 1. The heating time t and the respective instantaneous temperature T during the heating are also input into partial model 1. The calculated required time changes Δt and temperature changes ΔT for the required material properties are output from partial model 1 to the control for the heating means. The values of the chemical analysis %C, %Mn, etc., the calculated temperature T of the input stock, the calculated thickness h or the dimension of the input stock, the calculated precipitation state p and the calculated austenite grain size $d_\gamma$ are transferred from partial model 1 to partial model 2, in which the shaping of the input stock to the rolled product is simulated.

The partial model 2 includes the forming model D, e.g., as discussed in U.S. Pat. No. 5,357,443 and/or EP 0 541 825 (see, e.g., page 4, lines 45+"hot rolling model"); and/or Pietrzyk et al., *Thermal-Mechanical Modelling of the Flat Rolling Process,* Springer-Verlag Berlin Heidelberg (1991), the disclosure of which is also expressly incorporated by reference herein in its entirety, the transformation model U, e.g., as discussed in U.S. Pat. No. 5,357,443 and/or EP 0 541 825 (see, e.g., page 4, lines 45+), and/or Andorfer et al., *Prediction of the As Hot Rolled Properties of Plain Carbon Steels and HSLA Steels,* THERMEC '97 Proceedings, ed. T. Chandra and T. Sakai, the Metals, Minerals & Materials Society (TMS), pp. 4 (1997); and/or Buchmayr et al., *Modeling of the Temperature Field, Transformation Behaviour, Hardness and Mechanical Response of Low Alloy Steels During Cooling from the Austenite Region,* J. Heat Treat 8, pp. 127–136 (1990); and/or Scheil *Arch. Eisenhuittenwesen,* 8 pp. 565–567 (1935), the disclosures of which are also expressly incorporated by reference herein in their entireties, the recrystallization model R, e.g., as discussed in U.S. Pat. No. 5,357,443 and/or EP 0 541 825 (see, e.g., page 6, lines 18+), and/or Andorfer et al., *Prediction of the As Hot Rolled Properties of Plain Carbon Steels and HSLA Steels,* THERMEC '97 Proceedings, ed. T. Chandra and T. Sakai, the Metals, Minerals & Materials Society (TMS), pp. 4 (1997); and/or Anelli et al., "Application of Mathematical Modeling to Hot Rolling and Controlled Cooling of Wire Rods and Bars," *ISIJ International* 32 (3), pp. 440–449 (1992); and/or Sellers, *Hot Working and Forming Process,* ed. C. M. Sellars and G. J. Davies, Metals Soc. (London) pp. 3–15 (1980), the disclosures of which are also expressly incorporated by reference herein in their entireties, and the precipitation model P, which are connected to one another. This partial model 2 receives the time t or the rolling speed, the temperature T existing during this and the deformation φ of the rolled product from the individual rolling mill stands. The four models D, P, R and U calculate therefrom the temperature T of the rolled product, the dimensions h of the rolled product, the austenite grain size $d_\gamma$, the precipitation state p, the structural constituents $x_f$, $x_p$, etc. and the residual deformation $\phi_{rem}$, which, together with the values of the chemical analysis %C, %Mn, etc., are passed on to the partial model 3, which simulates the cooling phase of the rolled product. The partial model 2 furthermore outputs the time changes Δt, the temperature changes ΔT and the deformation changes Δφ for the required material properties to the controls of the rolling mill stands.

The partial model 3 includes the transformation model U, the precipitation model P, the cooling model C e.g., as discussed in U.S. Pat. No. 5,357,443 and/or EP 0 541 825 (see, e.g., page 4, lines 45+), and/or Andorfer et al., *Prediction of the As Hot Rolled Properties of Plain Carbon Steels and HSLA Steels,* THERMEC '97 Proceedings, ed. T. Chandra and T. Sakai, the Metals, Minerals & Materials Society (TMS), pp. 2 (1997), and the aging model V, which are also linked to one another. The model V for describing the influence of cold working and age hardening on the mechanical characteristics (above all the apparent yielding point) is generated as a regression model. Probes for a sufficient number of rolled products were cold worked at different intensities and stored at different temperatures for various lengths of time. The observed differences in the mechanical parameters (apparent yielding point, tensile strength, ductile yield) relative to the unworked reference probe were additionally specified as functions of the characteristics calculated for the material such as content of dissolved C and N, phase proportions, size of ferrite grains, etc., the chemical analysis of the materials, the grade of cold working, and the time and temperature between cold working and tensile testing. In the simplest case, this function is a linear function of the amounts already named and the low potencies of the degree of cold forming, approximately up to the third degree. The coefficients of this function can then be determined using statistical methods. A more complex formula for the part of the dissolved amounts of $C_{free}$ and $N_{free}$ of carbon and nitrogen as well as the aging temperature T and the aging time t is given in the equation:

$$(C_{free}+N_{free}) \cdot \exp(c_1/T) \cdot (1-\exp(-c_2 \cdot t))$$

$c_1$ and $c_2$ are the amounts to be inserted according to the measurement data. This formula can be expanded by a linear function of the other influential amounts mentioned and a polynomial function of the degree of cold forming. Because this function partially depends non-linearly on the coefficients to be determined, methods of non-linear regression analysis must be employed to determine them. The actual values of the cooling time t, the amounts w of coolant and the corresponding associated temperatures T are likewise transferred to the partial model 3 and the calculated required time changes $\Delta t$, the changes in amounts $\Delta w$ of coolant and temperature changes $\Delta AT$ for the required material properties are output from this partial model 3 to the control of the cooling device. In the partial model 3, the temperature T of the rolled product, the dimensions h of the rolled product, the austenite grain size $d_\gamma$, the precipitation state p, the structural constituents $x_f x_p$, the ferrite grain size $d_\alpha$ and the pearlite interlamellar spacing $\lambda_p$ are calculated and are fed together with the values of the chemical analysis %C, %Mn, etc. to the material model M, e.g., as discussed in U.S. Pat. No. 5,357,443 and/or EP 0 541 825 (see, e.g., page 8, lines 12 "structural property model"); and/or *Material Science and Technology,* vol. 7: "Constitutes and Properties of Steel," ed. R. W. Cahn, P. Haasen, E. J. Kramer, Wernheim New York Basel Cambridge (1992), the disclosure of which is also expressly incorporated by reference herein in their entireties, which also receives the degree of stretching S. from the variables supplied, the material model M calculates the yield point $R_{p0.2}$, the tensile strength $R_m$ and the breaking elongation point $A_x$. These are compared with the equivalent variables $R_{p0.2}$, $R_m$ and $A_x$ for the required material properties in 4 and the differences $\Delta R_{p0.2}$, $\Delta R_m$ and $\Delta A_x$ are fed to the partial models 1 to 3 and to the material model M.

Other examples of the above-noted models are disclosed in Yoshie et al. "Modelling of Microstructural Evolution and Mechanical Properties of Steel Plates Produced by Thermo-Mechanical Control Process," *ISIJ International,* vol. 32, No. 3, pp. 395–404 (1992), the disclosure of which is expressly incorporated by reference herein in its entirety.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for monitoring and controlling the quality of a rolled product from a hot-rolling process in which the rolled product is produced from an input stock wherein production conditions are detected on-line throughout the entire rolling process, wherein the mechanical/technological material properties to be expected of the rolled product are calculated in advance therefrom by means of interrelated physical/metallurgical and/or statistical models describing the entire rolling process, which comprises:
    a) identifying each input stock;
    b) inputting its characteristic properties into a physical/metallurgical austenitization and precipitation model which calculates the characteristic material properties from a time-temperature curve for heating the input stock to rolling temperature;
    c) inputting the material properties present after the heating into a physical/metallurgical deformation, recrystallization, transformation and precipitation model which calculates the characteristic properties from the time-temperature deformation sequence during rolling process;
    d) inputting the characteristic material properties present after rolling into a physical/metallurgical cooling, transformation, precipitation and aging model which calculates the characteristic properties of the rolled product from the cooling curve for the rolled product in a cooling device and during the subsequent free unforced remaining cooling and aging of the rolled product; and
    e) inputting the properties describing the rolled product finished for further use into a physical/metallurgical material model which determines the mechanical/technological material properties of the rolled product taking into account any cold forming.

2. The process as claimed in claim 1, further comprising, in the event of deviations of the precalculated material properties of the rolled product from the required mechanical/technological material properties of said product during the rolling process, correcting the deviations in a subsequent production step.

3. The process as claimed in claim 2, further comprising, in the event of deviations in the characteristic data of any of the input stock, of the heating curare of the rolling curve and of the cooling curve,
    calculating on-line the changes by means of the physical/metallurgical austenitization, deformation, recrystallization, transformation, precipitation, cooling and material models necessary for maintaining the required mechanical/technological material properties, in the time-temperature curve for the heating, in the time-temperature deformation curve during rolling and in the time-temperature curve during cooling, and
    transmitting the changes to the control systems of the heating, rolling and cooling plant.

4. The process as claimed in claim 1, further comprising
optimizing the reference chemical analysis of the input stock and the production conditions, which are determined by time-temperature curves and time-temperature deformation curves in the individual production steps, with the physical/metallurgical and/or statistical models describing the entire rolling process, and establishing the chemical analysis and the conditions for novel related product qualities with said models.

5. The process as claimed in claim 4, further comprising with a computer optimizing and establishing suitable production conditions for achieving the mechanical/technological properties of a rolled product bases upon the physical/metallurgical and the statistical models.

6. The process as claimed in claim 1, further comprising
optimizing the reference chemical analysis of the input stock and production conditions with the physical/metallurgical austenitization, deformation, recrystallization, transformation, precipitation, cooling and material models, and establishing the chemical analysis and the conditions for novel related product qualities with said models.

7. The process as claimed in claim 6, further comprising with a computer optimizing and establishing suitable production conditions for achieving the mechanical/technological properties of a rolled product based upon the physical/metallurgical and the statistical models.

8. The process as claimed in claim 1, further comprising
setting up statistical models by means of a linear regression method with data from samples of rolled products and associated input stock properties and production conditions and continuously improving the statistical models with further data from samples of rolled products and associated input stock properties and production conditions.

9. The process as claimed in claim 8, further comprising with a computer adapting, adjusting and improving the physical/metallurgical and the statistical models for calculating in advance the mechanical/technological properties of a rolled product.

10. The process as claimed in claim 1, further comprising adapting and adjusting the physical/metallurgical models using data from rolled products and their input stock properties and production conditions.

11. The process as claimed in claim 10, further comprising with a computer adapting, adjusting and improving the physical/metallurgical and the statistical models for calculating in advance the mechanical/technological properties of a rolled product.

12. The process as claimed in claim 1, further comprising with a computer
calculating the physical/metallurgical and the statistical models in advance of the mechanical/technological properties of a rolled product, and correcting on-line production conditions.

13. The process claimed in claim 1;
wherein the rolled product is a sheet, a strip, a profile, a rod, or a wire;

wherein the input stock is a slab, a thin slab, a bloom or a billet;

wherein the production conditions comprise temperature or reduction per pass;

wherein the mechanical/technological material properties to be expected comprise the yield point, the tensile strength and the breaking elongation point;

wherein the characteristic properties of each input stock comprise the chemical analysis, the dimension and the precipitation state arising from a preceding temperature curve;

wherein the precipitation state comprises size, amount, type, distribution of precipitates and degree of segregations;

wherein the distribution of precipitates comprises AlN, TiN, TiNbCN and VC;

wherein the characteristic material properties comprise austenite grain size and precipitation state;

wherein the precipitation state comprises dissolution of precipitates;

wherein the material properties present after the heating comprise temperature, dimension, austenite grain size and precipitation state;

wherein the characteristic properties comprise austenite grain size, temperature distribution, precipitation state, and degree of recrystallization;

wherein the characteristic properties of the rolled product comprise the microstructure and the precipitation state;

wherein the microstructure includes the proportions of structural constituents and their properties;

wherein the structural constituents include a member selected from the group consisting of austenite, ferrite grain size and pearlite interlamellar spacing;

wherein the rolled product comprises a rolled up, stacked or bundled state;

wherein the properties describing the rolled product finished for further use comprise dimension, chemical analysis, microstructure and precipitation state; and wherein cold forming includes stretcher and roller leveling.

14. The process as claimed in claim 13, further comprising, in the event of deviations of the precalculated material properties of the rolled product from the required mechanical/technological material properties of said product during the rolling process, correcting the deviations in a subsequent production step.

15. The process as claimed in claim 14, further comprising, in the event of deviations in the characteristic data of any of the input stock, of the heating curve, of the rolling curve and of the cooling curve, calculating on-line the changes by means of the physical/metallurgical austenitization, deformation, recrystallization, transformation, precipitation, cooling and material models necessary for maintaining the required mechanical/technological material properties, in the time-temperature curve for the heating, in the time-temperature deformation curve during rolling and in the time-temperature curve during cooling, and transmitting the changes to the control systems of the heating, rolling and cooling plant.

16. The process as claimed in claim 13, further comprising
optimizing the reference chemical analysis of the input stock and the production conditions, which are determined by time-temperature curves and time-temperature deformation curves in the individual production steps, with the physical/metallurgical and/or statistical models describing the entire rolling process, and establishing the chemical analysis and the conditions for novel related product qualities with said models.

17. The process as claimed in claim 16, further comprising with a computer optimizing and establishing suitable production conditions for achieving the mechanical/technological properties of a rolled product based upon the physical/metallurgical and the statistical models.

18. The process as claimed in claim 13, further comprising
    optimizing the reference chemical analysis of the input stock and production conditions with the physical/metallurgical austenitization, deformation, recrystallization, transformation, precipitation, cooling and material models, and
    establishing the chemical analysis and the conditions for novel related product qualities with said models.

19. The process as claimed in claim 18, further comprising with a computer optimizing and establishing suitable production conditions for achieving the mechanical/technological properties of a rolled product based upon the physical/metallurgical and the statistical models.

20. The process as claimed in claim 13, further comprising
    setting up statistical models by means of a linear regression method with data from samples of rolled products and associated input stock properties and production conditions, and
    continuously improving the statistical models with further data from samples of rolled products and associated input stock properties and production conditions.

21. The process as claimed in claim 20, further comprising with a computer adapting, adjusting and improving the physical/metallurgical and the statistical models for calculating in advance the mechanical/technological properties of a rolled product.

22. The process as claimed in claim 13, further comprising adapting and adjusting the physical/metallurgical models using,g data from rolled products and their input stock properties and production conditions.

23. The process as claimed in claim 22, further comprising with a computer adapting, adjusting and improving the physical/metallurgical and the statistical models for calculating in advance the mechanical/technological properties of a rolled product.

24. The process as claimed in claim 13, further comprising with a computer
    calculating physical/metallurgical and the statistical models in advance of the mechanical/technological properties of a rolled product, and
    correcting on-line production conditions.

25. An apparatus for monitoring and controlling the quality of a rolled product from a hot-rolling process in which the rolled product is produced from an input stock wherein production conditions are detected on-line throughout the entire rolling process, wherein the mechanical/technological material properties to be expected of the rolled product are calculated in advance therefrom by means of interrelated physical/metallurgical and/or statistical models describing the entire rolling process, which comprises:
    a) an identifier for identifying each input stock;
    b) a system that inputs each input stock's characteristic properties into a physical/metallurgical austenitization and precipitation model which calculates the characteristic material properties from a time-temperature curve for heating the input stock to rolling temperature;
    c) a system that inputs the material properties present after the heating into a physical/metallurgical deformation, recrystallization, transformation and precipitation model which calculates the characteristic properties from the time-temperature deformation sequence during rolling process;
    d) a system that inputs these material properties into a physical/metallurgical cooling, transformation, precipitation and aging model which calculates the characteristic properties of the rolled product from the cooling curve for the rolled product in a cooling device and during the subsequent free unforced remaining cooling and aging of the rolled product; and
    e) a system that inputs the properties describing the rolled product finished for further use into a physical/metallurgical material model which determines the mechanical/technological material properties of the rolled product taking into account any cold forming.

26. The apparatus as claimed in claim 25, further comprising, in the event of deviations of the precalculated material properties of the rolled product from the required mechanical/technological material properties of said product during the rolling process,
    a system that corrects the deviations in a subsequent production step.

27. The apparatus as claimed in claim 26, further comprising, in the event of deviations in the characteristic data of the input stock, of the heating curve, of the rolling curve and of the cooling curve,
    a calculator that calculates on-line the changes from the physical/metallurgical austenitization, deformation, recrystallization, transformation, precipitation, cooling and material models necessary for maintaining the required mechanical/technological material properties, in the time-temperature curve for the heating, in the time-temperature deformation curve during rolling and in the time-temperature curve during cooling, and
    a transmitter for transmitting the changes to the control systems of the heating, rolling and cooling plant.

28. The apparatus as claimed in claim 25, further comprising
    a system that optimizes the reference chemical analysis of the input stock and the production conditions, which are determined by time-temperature curves and time-temperature deformation curves in the individual production steps, with the physical/metallurgical and/or statistical models describing the entire rolling process and
    a system that establishes the chemical analysis and the conditions for novel related product qualities with said models.

29. The apparatus as claimed in claim 28, further comprising
    a process computer for the physical/metallurgical and the statistical models for optimizing and establishing suitable production conditions for achieving the mechanical/technological properties of a rolled product.

30. The apparatus as claimed in claim 25, further comprising
    a system that optimizes the reference chemical analysis of the input stock and production conditions with the physical/metallurgical austenitization, deformation, recrystallization, transformation, precipitation, cooling and material models and
    a system that establishes the chemical analysis and the conditions for novel related product qualities with said models.

31. The apparatus as claimed in claim 30, further comprising
   a process computer for the physical/metallurgical and the statistical models for optimizing and establishing suitable production conditions for achieving the mechanical/technological properties of a rolled product.

32. The apparatus as claimed in claim 25, further comprising
   a system that establishes statistical models by means of a linear regression method with data from samples of rolled products and associated input stock properties and production conditions, and an improver for continuously improving with further data from samples of rolled products and associated input stock properties and production conditions.

33. The apparatus as claimed in claim 32, further comprising
   a process computer to adapt, adjust and improve the physical/metallurgical and the statistical models for calculating in advance the mechanical/technological properties of a rolled product.

34. The apparatus as claimed in claim 25, further comprising
   a system that adapts and adjusts the physical/metallurgical models using data from rolled products and their input stock properties and production conditions.

35. The apparatus as claimed in claim 34, further comprising
   a process computer to adapt, adjust and improve the physical/metallurgical and the statistical models for calculating in advance the mechaical/technological properties of a rolled product.

36. The apparatus as claimed in claim 25, further comprising
   a process computer to calculate physical/metallurgical and the statistical models in advance of the mechanical/technological properties of a rolled product and to correct on-line production conditions.

37. A computer program embodied on a computer readable medium for monitoring and controlling the quality of a rolled product from a hot-rolling process in which the rolled product is produced from an input stock wherein production conditions are detected on-line throughout the entire rolling process, wherein the mechanical/techiological material properties to be expected of the rolled product are calculated in advance therefrom by means of interrelated physical/metallurgical and/or statistical models describing the entire rolling process, which comprises:
   a) identifying each input stock;
   b) inputting its characteristic properties into a physical/metallurgical austenitization and precipitation model which calculates the characteristic material properties from a time-temperature curve for heating the input stock to rolling temperature;
   c) inputting the material properties present after the heating into a physical/metallurgical deformation, recrystallization, transformation and precipitation model which calculates the characteristic properties from the time-temperature deformation sequence during rolling process;
   d) inputting these material properties into a physical/metallurgical cooling, transformation, precipitation and aging model which calculates the characteristic properties of the rolled product from the cooling curve for the rolled product in a cooling device and during the subsequent free unforced remaining cooling and aging of the rolled product; and
   e) inputting the properties describing the rolled product finished for further use into a physical/metallurgical material model which determines the mechanical/technological material properties of the rolled product taking into account any cold forming.

38. The computer program embodied on a computer readable medium of claim 37, further comprising, in the event of deviations of the precalculated material properties of the rolled product from the required mechanical/technological material properties of said product during the rolling process,
   correcting the deviations in a subsequent production step.

39. The computer program embodied on a computer readable medium of claim 38, further comprising, in the event of deviations in the characteristic data of any of the input stock, of the heating curve, of the rolling curve and of the cooling curve,
   calculating on-line the changes by means of the physical/metallurgical austenitization, deformation, recrystallization, transformation, precipitation, cooling and material models necessary for maintaining the required mechanical/technological material properties, in the time-temperature curve for the heating, in the time-temperature deformation curve during rolling and in the time-temperature curve during cooling, and
   transmitting the changes to the control systems of the heating, rolling and cooling plant.

40. The computer program embodied on a computer readable medium of claim 37, further comprising
   optimizing the reference chemical analysis of the input stock and the production conditions, which are determined by time-temperature curves and time-temperature deformation curves in the individual production steps, with the physical/metallurgical and/or statistical models describing the entire rolling process, and
   establishing the chemical analysis and the conditions for novel related product qualities with said models.

41. The computer program embodied on a computer readable medium of claim 40, further comprising with a computer optimizing and establishing suitable production conditions for achieving the mechanical/technological properties of a rolled product bases upon the physical/metallurgical and the statistical models.

42. The computer program embodied on a computer readable medium of claim 37, further comprising
   optimizing the reference chemical analysis of the input stock and production conditions with the physical/metallurgical austenitization, deformation, recrstallization, transformation, precipitation, cooling and material models, and
   establishing the chemical analysis and the conditions for novel related product qualities with said models.

43. The computer program embodied on a computer readable medium of claim 42, further comprising with a computer optimizing and establishing suitable production conditions for achieving the mechanical/technological properties of a rolled product based upon the physical/metallurgical and the statistical models.

44. The computer program embodied on a computer readable medium of claim 37, further comprising
   setting up statistical models by means of a linear regression method with data from samples of rolled products and associated input stock properties and production conditions, and continuously improving the statistical models with further data from samples of rolled products and associated input stock properties and production conditions.

45. The computer program embodied on a computer readable medium of claim 44, further comprising with a computer adapting, adjusting and improving the physical/metallurgical and the statistical models for calculating in advance the mechanical/technological properties of a rolled product.

46. The computer program embodied on a computer readable medium of claim 37, further comprising adapting and adjusting the physical/metallurgical models using data from rolled products and their input stock properties and production conditions.

47. The computer program embodied on a computer readable medium of claim 46, further comprising with a computer adapting, adjusting and improving the physical/metallurgical and the statistical models for calculating in advance the mechanical/technological properties of a rolled product.

48. The computer program embodied on a computer readable medium of claim 37, further comprising with a computer calculating the physical/metallurgical and the statistical models in advance of the mechanical/technological properties of a rolled product, and correcting on-line production conditions.

49. The process as claimed in claim 1, wherein the rolled product comprises steel.

50. The apparatus as claimed in claim 25, wherein the rolled product comprises steel.

51. The computer program embodied on a computer readable medium of claim 37, wherein the rolled product comprises steel.

* * * * *